(12) United States Patent
Wang et al.

(10) Patent No.: US 10,571,791 B2
(45) Date of Patent: Feb. 25, 2020

(54) PROJECTION SYSTEM AND OPTIMIZING METHOD THEREOF

(71) Applicant: DELTA ELECTRONICS, INC., Taoyuan (TW)

(72) Inventors: Bor Wang, Taoyuan (TW); Kai-Ming Liu, Taoyuan (TW); Ming-Yo Hsu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/388,885

(22) Filed: Apr. 19, 2019

(65) Prior Publication Data

US 2019/0331994 A1 Oct. 31, 2019

(30) Foreign Application Priority Data

Apr. 25, 2018 (CN) .......................... 2018 1 0377159
Mar. 25, 2019 (CN) .......................... 2019 1 0228334

(51) Int. Cl.
*G03B 21/14* (2006.01)
*H04N 9/31* (2006.01)
*G03B 21/20* (2006.01)

(52) U.S. Cl.
CPC ....... *G03B 21/204* (2013.01); *G03B 21/2013* (2013.01); *H04N 9/3111* (2013.01); *H04N 9/3161* (2013.01); *H04N 9/3182* (2013.01)

(58) Field of Classification Search
CPC .............. G03B 21/204; G03B 21/2013; H04N 9/3182; H04N 9/3111; H04N 9/3161; H04N 9/3164

(Continued)

(56) References Cited

U.S. PATENT DOCUMENTS 8,840,267 B2 * 9/2014 Li .................. G02B 27/149
362/231
2012/0133903 A1 * 5/2012 Tanaka ............... G03B 21/2013
353/31

(Continued)

FOREIGN PATENT DOCUMENTS

CN 103090320 A 5/2013
CN 103913940 A 7/2014

(Continued)

OTHER PUBLICATIONS

Emmanuel Finck, Laser Technologies Showcase, https://cinemanext.com/features/showcases/laser-technologies-showcase, CinemaNext, 2019 YMAGIS SA.

*Primary Examiner* — William C. Dowling
(74) *Attorney, Agent, or Firm* — CKC & Partners Co., LLC

(57) ABSTRACT

A projection system is provided, which includes a first light source, a second light source, a wavelength converter, a first light splitting element, and a second light splitting element. The first light source is configured to emit a first light. The second light source is configured to emit a second light. The wavelength converter is configured to convert portions or all of the second light into a third light. The third light includes a red light and a green light. A wavelength range of the first light is within a wavelength range of the red light. The first light splitting element is configured to permit the first light to pass through or to be reflected. The second light splitting element is configured for removing a portion of the first light or not removing the first light.

20 Claims, 8 Drawing Sheets

(58) Field of Classification Search
USPC .......................................................... 353/84
See application file for complete search history.

(56) References Cited

U.S. PATENT DOCUMENTS

| | | | |
|---|---|---|---|
| 2018/0088452 A1 | 3/2018 | Tajiri | |
| 2018/0217486 A1* | 8/2018 | Tanaka | ................. G02B 27/283 |
| 2019/0041735 A1* | 2/2019 | Tanaka | ................ G03B 21/2013 |
| 2019/0246080 A1* | 8/2019 | Pan | ...................... G03B 21/208 |

FOREIGN PATENT DOCUMENTS

| | | |
|---|---|---|
| CN | 104345534 A | 2/2015 |
| CN | 104808425 A | 7/2015 |
| JP | 2006-003671 A | 1/2006 |
| TW | I584048 B | 5/2017 |
| TW | 201743125 A | 12/2017 |
| TW | 201807479 A | 3/2018 |

* cited by examiner

PROJECTION SYSTEM AND OPTIMIZING METHOD THEREOF

RELATED APPLICATIONS

This application claims priority to China Application Serial Number 201810377159.3, filed Apr. 25, 2018, and China Application Serial Number 201910228334.7, filed Mar. 25, 2019, all of which are herein incorporated by reference.

BACKGROUND

Field of Invention

The present invention relates to a projection system and an optimization method thereof.

Description of Related Art

In general, there is difficulty for a projection system configured with a yellow phosphor wheel to achieve a required intensity, chromaticity, and white balance according to a digital cinema initiatives (DCI) standard. Since light converted by a yellow phosphor includes inhomogeneous red and green light, additional device elements must be added to reduce the red or green light respectively to make the projection system achieve the required chromaticity and white balance according to the DCI standards. As a result, the overall intensity of the projection system is reduced, and the power output of a light source then need to be raised to meet the required intensity according to the DCI standard. However, there are limitations to the power output of the light source, and working with a high power output may put the light source under risk of over-heating, reduction in life span and efficiency, etc.

SUMMARY

According to one aspect of the present disclosure, a projection system is provided, which includes a first light source, a second light source, a wavelength converter, a first light splitting element, and a second light splitting element. The first light source is configured to emit a first light. The second light source is configured to emit a second light. The wavelength converter is configured to convert a portion or all of the second light into a third light, in which the third light includes a green light and a red light. A wavelength range of the first light is within a wavelength range of the red light, and the wavelength range of the first light is greater than a peak intensity wavelength of the red light. The first light splitting element is configured to permit the first light to pass through or to be reflected. The second light splitting element is configured to remove a portion of the red light of the third light. The second light splitting element has a cut-off wavelength within the wavelength range of the first light configured for removing a portion of the first light or outside the wavelength range of the first light configured for not removing the first light.

In some embodiments, a peak intensity wavelength of the second light is shorter than a peak intensity wavelength of the third light. The peak intensity wavelength of the third light is shorter than a peak intensity wavelength of the first light.

In some embodiments, the projection system further includes a light distribution device configured to split the second light into a first portion and a second portion. The wavelength converter is configured to convert the first portion of the second light into the third light.

In some embodiments, the projection system is configured to provide a plurality of light paths. The light paths include: the first light travels by, in the order of, the first light splitting element, and then the second light splitting element; the first portion of the second light travels by, in the order of, the second light splitting element, the wavelength converter, and then the second light splitting element; and the second portion of the second light travels by, in the order of, the first light splitting element, and then the second light splitting element.

In some embodiments, the first light splitting element is configured to incorporate the first light and the second portion of the second light. The second light splitting element is configured to incorporate the first light, the second portion of the second light, and an unremoved portion of the third light into a white light.

In some embodiments, the projection system further includes an integrator. The white light incidents into the integrator.

In some embodiments, the projection system further includes a third light source configured to emit a fourth light.

In some embodiments, the projection system is configured to provide a plurality of light paths. The light paths include: the first light travels by, in the order of, the first light splitting element, and then the second light splitting element; the second light travels by, in the order of, the second light splitting element, the wavelength converter, and then the second light splitting element; and the fourth light travels by, in the order of, the first light splitting element, and then the second light splitting element.

In some embodiments, a peak intensity wavelength of the second light is shorter than a peak intensity wavelength of the fourth light. The peak intensity wavelength of the fourth light is shorter than a peak intensity wavelength of the third light. The peak intensity wavelength of the third light is shorter than a peak intensity wavelength of the first light.

In some embodiments, the first light splitting element is configured to incorporate the first light and the fourth light. The second light splitting element is configured to incorporate an unremoved portion of the first light, an unremoved portion of the third light, and the fourth light into a white light.

In some embodiments, the projection system further includes an integrator. The white light incidents into the integrator.

In some embodiments, the second light splitting element is a dichroic including a half transmission wavelength (T50%) between the peak intensity wavelength of the first light and the peak intensity wavelength of the third light.

In some embodiments, the wavelength range of the first light is 637 nm to 642 nm, and the half transmission wavelength of the second light splitting element is 629 nm.

In some embodiments, the wavelength range of the first light is 642 nm to 646 nm, and the half transmission wavelength of the second light splitting element is 631 nm.

In some embodiments, the projection system further includes a notch filter. The notch filter is configured with two half transmission wavelengths of 565 nm and 586 nm, and a lowest transitivity of less than 40%.

According to another aspect of the present disclosure, an optimization method for the projection system is provided. The optimization method includes the steps of: (a) using the second light splitting element to remove a portion of the first light and/or the third light; (b) adjusting an amount of the removed portion of the first light and an amount of the removed portion of the third light; (c) adjusting a power of the first light source to make chromaticity and white balance of the projection system to achieve a predetermined standard; and (d) repeating step (b) and step (c) to obtain a lowest power of the first light source.

In some embodiments, step (a) further includes: (i) defining a boundary wavelength; (ii) removing a portion of the first light that has a wavelength shorter than the boundary wavelength; and (iii) removing a portion of the third light that has a wavelength longer than the boundary wavelength.

In some embodiments, the boundary wavelength is defined between a peak intensity wavelength of the first light and a peak intensity wavelength of the third light.

In some embodiments, in step (b), the adjusting the amount of the removed portion of the first light and the amount of the removed portion of the third light is performed by adjusting the boundary wavelength.

In some embodiments, step (b) further includes: using tristimulus values to provide weighting for the amount of the removed portion of the first light and the amount of the removed portion of the third light and calculating an optimized value of the boundary wavelength.

The provided projection system is assisted with a first light source, which assists the projection system to achieve the digital cinema initiatives (DCI) standards with relative low power output and reduce the risk of thermal quench of the light sources. In addition, by properly designing the second light splitting element, the intensity ratio of the red, green, and blue light, white balance, and chromaticity of the projection system may more easily achieve the DCI standards. In another aspect, an optimization method which takes the tristimulus values into consideration may effectively enhance the operation efficiency of the projection system. The aforementioned projection system and optimization method are compatible with prior art projection systems for providing technical effects at lower cost.

DETAILED DESCRIPTION

Figure 1:
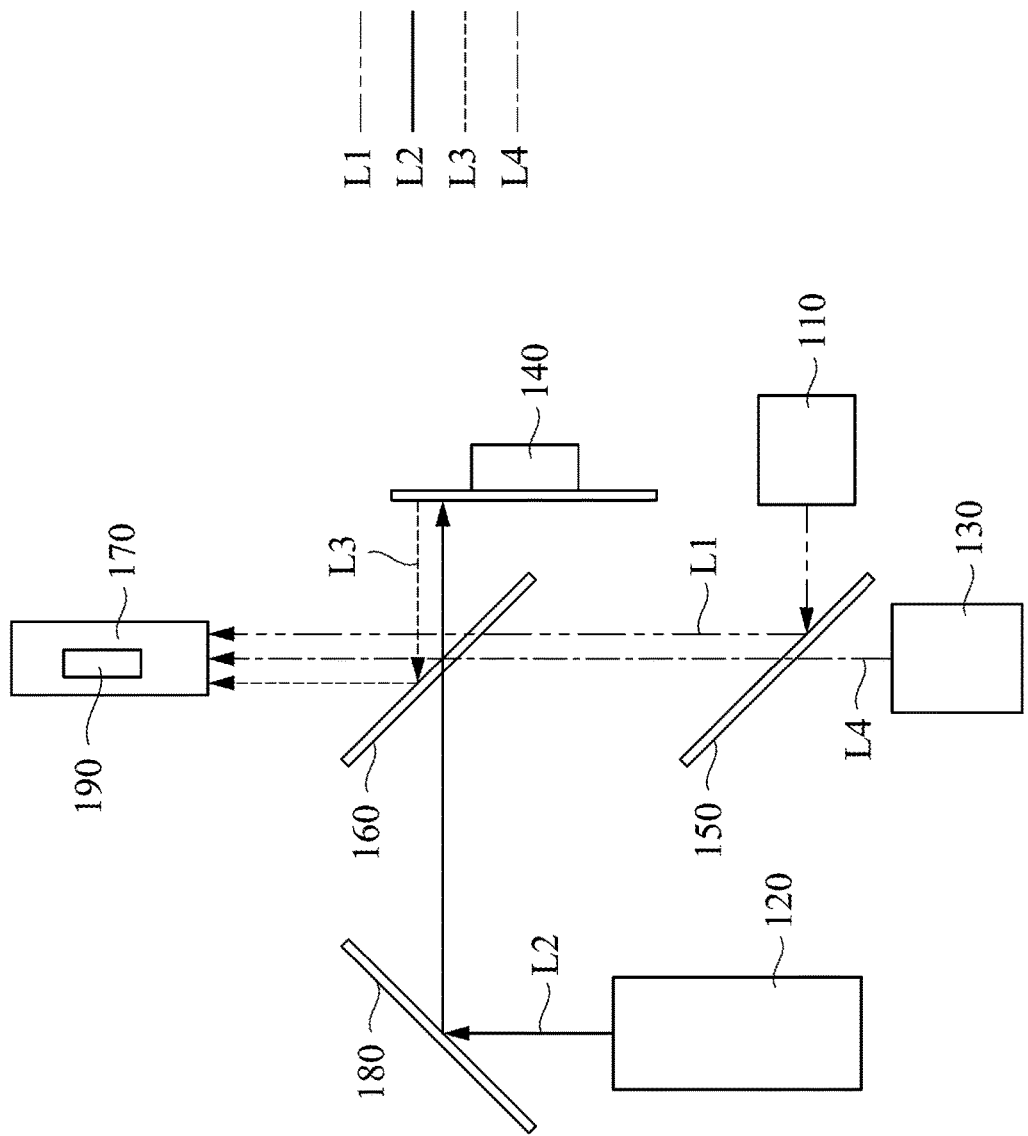
FIG. 1 illustrates a schematic top view of a projection system according to an embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

Reference is made to FIG. 1, a projection system 100 includes a first light source 110, a second light source 120, a third light source 130, a wavelength converter 140, a first light splitting element 150, a second light splitting element 160, a light integrator 170, and a light path adjusting element 180. The first light source 110 is configured to emit a first light L1, the second light source 120 is configured to emit a second light L2, and the third light source 130 is configured to emit a fourth light L4. The wavelength converter 140 is configured to convert the second light L2 into a third light L3. The first light splitting element 150 is configured to incorporate the first light L1 and the fourth light L4 towards the second light splitting element 160, and the second light splitting element 160 is configured to incorporate the first light L1, the third light L3, and the fourth light L4 towards the light integrator 170. It should be noted that, the aforementioned splitting elements incorporate multiple lights together by merging their light paths into one. However, it is not necessarily for multiple lights to be simultaneously lit up. It is possible that the light sources may emit light simultaneously or alternatively.

As shown in FIG. 1, the first light L1 emitted by the first light source 110 travels in the order of the first light splitting element 150 and the second light splitting element 160, to the light integrator 170. The second light L2 emitted by the second light source 120 travels in the order of the light path adjusting elements 180, the second light splitting element 160, the wavelength converter 140 which converts the second light L2 into the third light L3, and the third light L3 travels to the second light splitting element 160, then to the light integrator 170. The fourth light L4 emitted by the third light source 130 travels in the order of the first light splitting element 150 and the second light splitting element 160, to the light integrator 170. It should be noted that, the light paths mentioned above may be altered according to practical implementations. For example, additional light path adjusting elements 180 may be placed into any of the light paths shown in FIG. 1, so as to change the light paths and location of each device element. In particular, the light path adjusting element 180 may be a reflective mirror.

The first light splitting element 150 and the second light splitting element 160 are configured to split a light beam into various compositions of different wavelength ranges. In the present embodiment, the first light splitting element 150 and the second light splitting element 160 may reflect light band of a certain wavelength range, and permit light band of other wavelength ranges to pass through, as such splitting a light. For example, in an embodiment, the first light splitting element 150 and the second light splitting element 160 are both dichroic, and the reflection wavelength range and the transmission wavelength range of the dichroic may be controlled by changing the half transmission wavelength (T50%) of the dichroic. In other embodiments, different device elements may be implemented as the first light splitting element 150 or the second light splitting element 160. For example, an X cube may be implemented to split the light into different composition.

As shown in FIG. 1, the first light L1 and the fourth light L4 incident upon two opposite surfaces of the first light splitting element 150. The first light splitting element 150 permits the fourth light L4 to pass through and reflect the first light L1, and incorporating the first light L1 and the fourth light L4 into a same beam of light. Further, the combined beam of light (which includes the first light L1 and the fourth light L4) and the second light L2 incident upon the same side of the second light splitting element 160. The second light splitting element 160 permits the first light L1, the second light L2, and the fourth light L4 to pass through. For the second light L2, after passing through the second light splitting element 160, it incidents upon the wavelength converter 140, which then converts the second light L2 into the third light L3. The converted third light L3 incidents upon the other side of the second light splitting element 160, and is reflected by the second light splitting element 160, wherein the second light splitting element 160 incorporates the first light L1, the third light L3, and the fourth light L4 into a same beam of light.

As shown in FIG. 1, the first light L1, the third light L3, and the fourth light L4, together incident upon the light integrator 170. It should be noted that, additional optic elements may be added before, within, or after the light integrator 170 to tune the first light L1, the third light L3, and the fourth light L4, to optimize performance of the projection system 100.

Figure 2:
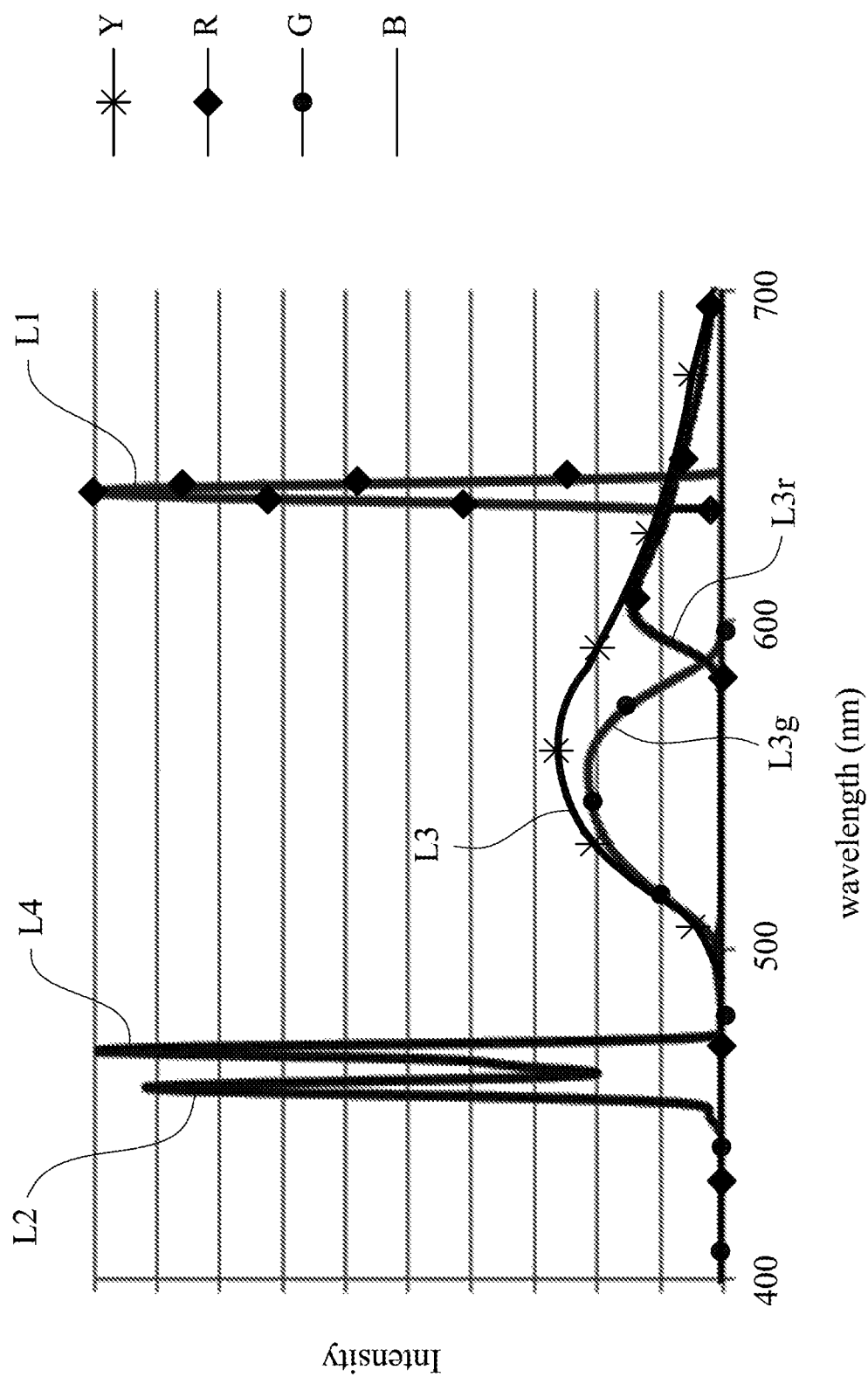
FIG. 2 illustrates an intensity-wavelength diagram of the lights of the projection system shown in FIG. 1.

Reference is made to FIG. 2, which shows that a peak intensity wavelength (the wavelength corresponding to the highest intensity) of the second light L2 is shorter than a peak intensity wavelength of the fourth light L4, which is shorter than a peak intensity wavelength of the third light L3, which is shorter than a peak intensity wavelength of the first light L1.

For the embodiment represented by FIG. 2 the first light source 110 is a red light laser configured to emit the first light L1 which has a wavelength in a range from 637 nm to 646 nm and a peak intensity wavelength about 638 nm. The second light source 120 is a blue light laser configured to emit the second light L2 which has a peak intensity wavelength about 455 nm. The third light source 130 is a red light laser configured to emit the fourth light L4 which has a peak intensity wavelength about 462 nm. The wavelength converter 140 is a yellow phosphor wheel, and the second light L2 is converted into the third light L3 by the wavelength converter 140, in which the third light L3 has a peak intensity wavelength in a range from 500 nm to 700 nm.

In some embodiments, waveform, wavelength range, and peak intensity wavelength of the second light L2 emitted by the second light source 120 may be tuned according to the implemented wavelength converter 140. This may provide a better conversion effect to enhance an intensity of the third light L3. For example, the wavelength range and peak intensity wavelength of the second light L2 emitted by the second light source 120 may be adjusted according to properties (e.g. conversion rate for different wavelengths) of the phosphor on the yellow phosphor wheel.

As shown in FIG. 2, the third light L3 may be divided into a green light L3g with a peak intensity wavelength in a range from 500 nm to 600 nm, and a red light L3r in a range from 600 nm to 700 nm.

As shown in FIG. 1 and FIG. 2, the third light L3 includes green wavelength and red wavelength, the fourth light L4 includes blue wavelength, and thus the third light L3 and the fourth light L4 may be incorporated into the light integrator 170 as a white light, and which may be adopted as a primary light of the projection system 100. As shown in FIG. 2, in some circumstances, an intensity of the red light L3r is lower than an intensity of the green light L3g, and at such conditions the first light L1 incorporated into the light integrator 170 may be used to reinforce the intensity of the red light.

As shown in FIG. 1 and FIG. 2, the chromaticity, white balance, and intensity of the projection system 100 may achieve a digital cinema initiatives (DCI) standard by adjusting the intensity and peak intensity wavelength of the first light L1 emitted by the first light source 110. In addition, the first light source 110 may reduce the necessary power output of the second light source 120 emitting second light L2 to interact with the wavelength converter 140, enabling the second light source 120 to work with lower power output, and thus reducing the risk of thermal quench.

Figure 3:
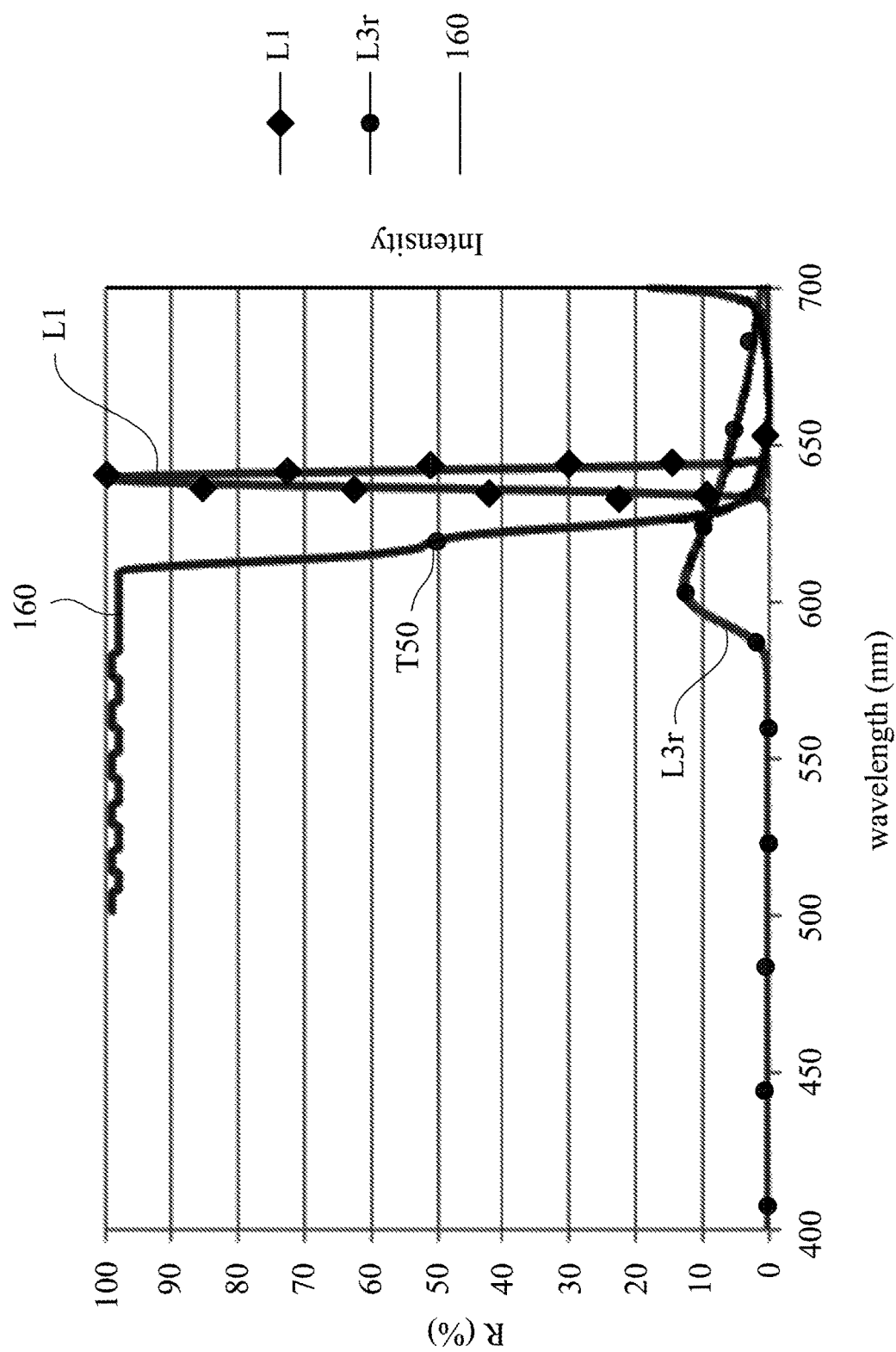
FIG. 3 illustrates a reflectivity-wavelength diagram of a second light splitting element and an intensity-wavelength diagram of a fourth light's red light wave band and a third light, of the projection system shown in FIG. 1.

Reference is made to FIG. 1 and FIG. 3, the second light splitting element 160 is configured to reflect most of the light with wavelength shorter than the half transmission wavelength T50 (which is the wavelength corresponding to a reflectivity equal to 50%) of the second light splitting element 160, and permit most of the light with wavelength longer than the half transmission wavelength T50 of the second light splitting element 160 to pass. In other words, the second light splitting element 160 shown in FIG. 1 is configured to reflect most of the third light L3, and permit most of the first light L1 to pass. By adjusting the half transmission wavelength T50 of the second light splitting element 160, one may control the ratio of the first light L1 and the red light L3r of the third light L3 that is incorporated into the light integrator 170. For example, by designing the half transmission wavelength T50 of the second light splitting element 160 to be between the peak intensity wavelength of the first light L1 and the peak intensity wavelength of the third light L3, one may allow most of the first light L1 and the third light L3 to be incorporated into the light integrator 170.

As shown in FIG. 3, in the present embodiment, the red light L3r of the third light L3 has a wider wavelength range, the first light L1 has a narrower wavelength range. The wavelength range of the first light L1 is within the wavelength range of the red light L3r, and the peak intensity wavelength of the first light L1 is greater than the peak intensity wavelength of the red light L3r. In other words, the wavelength range of the first light L1 is covered by the wavelength range of the red light L3r. Accordingly, for permitting the first light L1 to pass through the second light splitting element 160 and reflecting the third light L3 to the light integrator 170 by the second light splitting element 160, not all of the third light L3 is retained, and at least a portion of the third light L3 would be removed by the second light splitting element 160 no matter how the half transmission wavelength is set. Accordingly, it is unable to retain all the first light L1 and all the third light L3 to be incorporated into the light integrator 170.

In particular, if the half transmission wavelength of the second light splitting element 160 is designed to be longer, then the reflectivity of the third light L3 with respect to second light splitting element 160 may be increased, however the transitivity of the first light L1 would be reduced. In contrast, if the half transmission wavelength of the second light splitting element 160 is designed to be shorter, the transitivity of the first light L1 with respect to second light splitting element 160 may be increased, however the reflectivity of the third light L3 with respect to second light splitting element 160 would be reduced. As a result, designing the half transmission wavelength of the second light splitting element 160 requires thorough consideration.

Since the first light source 110 emits the first light L1 with a better color saturation, and thus in some embodiments, the first light L1 emitted by the first light source 110 may be entirely retained. In other words, the half transmission wavelength is designed outside of the wavelength range of the first light L1. In other words, a shortest wavelength within the wavelength range of the first light L1 is greater than a shortest wavelength within a full transmission wavelength range (which corresponds to reflectivity equal to 0%) of the second light splitting element 160. Under such condition, almost 100% of the first light L1 passes through the second light splitting element 160. In other words, although some portions of the red light L3r passing through the second light splitting element 160 is sacrificed, the first light L1 with a better color saturation is entirely incorporated into the light integrator 170. However, in this case, a higher intensity of the first light source 110 is needed to make the projection system 100 to achieve the white balance of the DCI standard. It should be noted that, the shortest wavelength within the full transmission wavelength range of the second light splitting element 160 is called a cut-off wavelength. As described by the following paragraphs, another kind of light splitting element is provided to reflect light with wavelength longer than the half transmission wavelength, and permit light with wavelength shorter than the half transmission wavelength to pass through, and the longest wavelength within the full transmission wavelength range is also called a cut-off wavelength.

In the present embodiment, a portion of the first light L1 emitted by the first light source 110 is removed. In other words, the shortest wavelength (the cut-off transmission wavelength) within the wavelength range (the full transmission wavelength range) with reflectivity 0% of the second light splitting element 160 is located within the wavelength range of the first light L1. Under such condition, a portion of the first light L1 would not be incorporated into the light integrator 170. Compared with the embodiment that entirely retains the first light L1 into the light integrator 170, more of the third light L3 is incorporated into the light integrator 170. The intensity of the first light L1 is higher than the intensity of the third light L3, which, compared with the embodiment that entirely retains the first light L1 into the light integrator 170, the light incorporated into the light integrator 170 has a lower intensity. As a result, the first light source 110 may help the projection system 100 to achieve a white balance of the DCI standards by a relative low power output.

For example, in an embodiment, the wavelength range of the first light L1 is in a range from 637 nm to 642 nm, and the half transmission wavelength of the second light splitting element 160 is about 629 nm (in which the cut-off wavelength would in a range between 637 nm to 642 nm). The second light splitting element 160 removes approximately 5.5% of the first light L1 output by the first light source 110. By adjusting the output power of the first light source 110 to make the projection system 100 achieve the DCI standard, the present embodiment could save about 8.4% of power output of the first light source 110 compared to the embodiment that entirely retain the first light L1 into the light integrator 170.

In another example, the first light L1 may have a wavelength range in a range about 642 nm to 646 nm, and the half transmission wavelength of the second light splitting element 160 is about 631 nm (in which the cut-off wavelength would in a range between 642 nm to 646 nm). This embodiment may achieve a similar effect, wherein the second light splitting element 160 removes about 5.5% of the first light L1 from the first light source 110. As the projection system 100 achieves the DCI standard, the present embodiment could save about 8.4% of power output of the first light source 110 compared to the embodiment that entirely retain the first light L1 into the light integrator 170.

The aforementioned numerical values are illustrative examples, and it is envisaged that a person skilled in the art may choose the parameters according to practical needs, and the present disclosure is not limited thereto. For example, in some practical design, one may determine the first light L1 should be entirely retained or partially removed, and provided to the light integrator 170 according to intensity distribution of the green light and red light of the third light L3.

Figure 4:
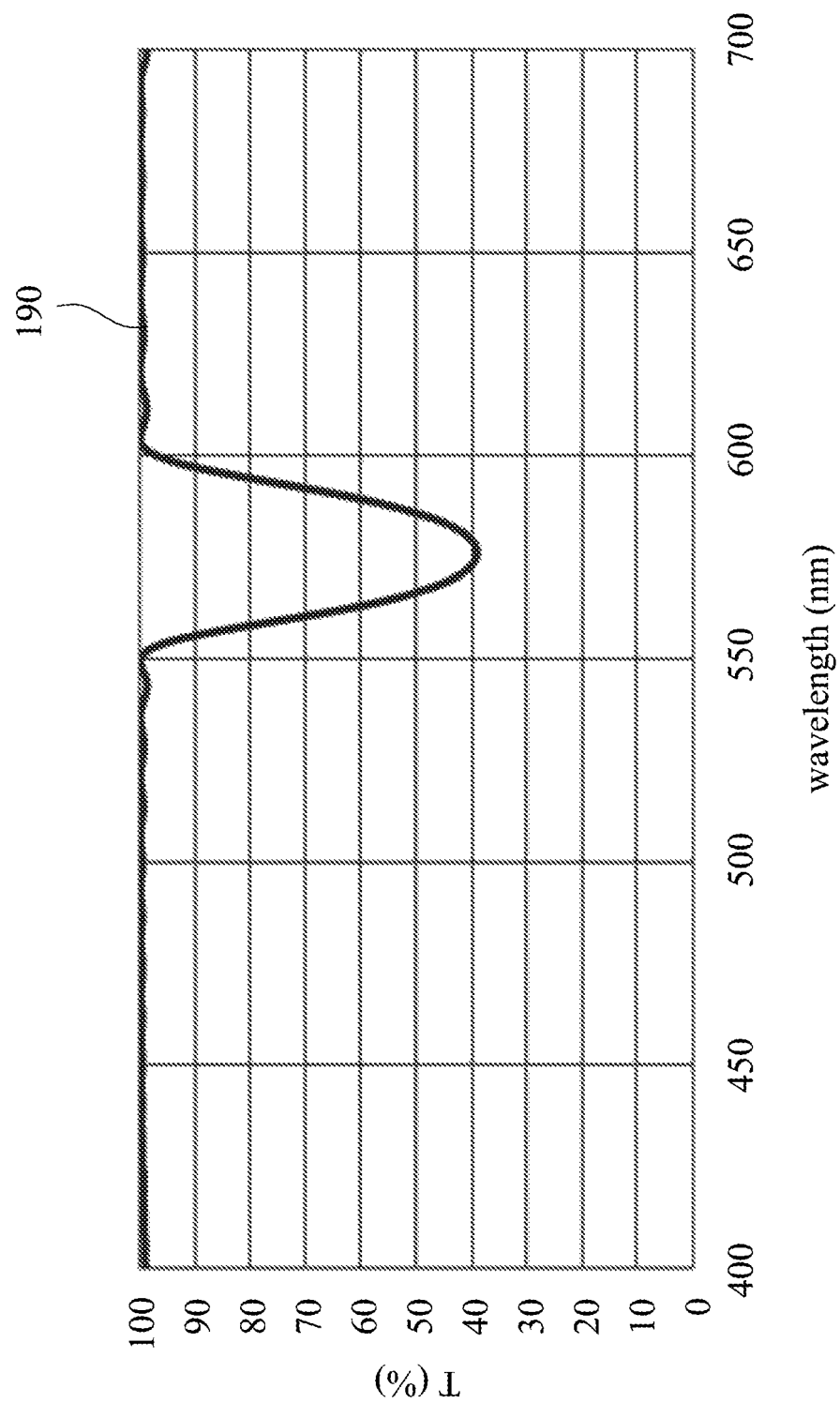
FIG. 4 illustrates a transitivity-wavelength diagram of a notch filter of the projection system shown in FIG. 1.

In some embodiments, the notch filter 190 may be located within the light integrator 170. Referring to FIG. 4, since within the third light L3, the intensity of green light is higher than the intensity of red light, the projection system 100 further includes a notch filter 190 to adjust the intensity ratio of the red light and the green light of the projection system 100. The notch filter 190 may reduce the intensity of the green light or the red light respectively, as such adjusting the intensity ratio of the red light and the green light and making the projection system 100 achieve a better color balance.

In the present embodiment, since the first light source 110 and the second light splitting element 160 enhance the intensity ratio of the red light and the green light of the projection system 100, the notch filter 190 only needs to slightly reduce the intensity of the green light of the projection system 100 to achieve the desired color balance.

In particular, the notch filter 190 shown in FIG. 4 may be adopted in the present embodiment, in which the two half transmission wavelength of the notch filter 190 may be 565 nm and 586 nm respectively, and the lowest transitivity of the notch filter 190 is slightly below 40%. In the present embodiment, the notch filter 190 only reduce about 20% of the total intensity to make the projection system 100 achieve the DCI standard. In embodiments that do not implement the first light source 110 and the second light splitting element 160, the notch filter 190 can have a lowest transitivity slightly lower than 10%, and it would reduce about 40% of the total intensity to make the projection system 100 achieve the DCI standard. In other words, the present embodiment more efficiently utilizes the first light source 110, the second light source 120, and the third light source 130.

Figure 5:
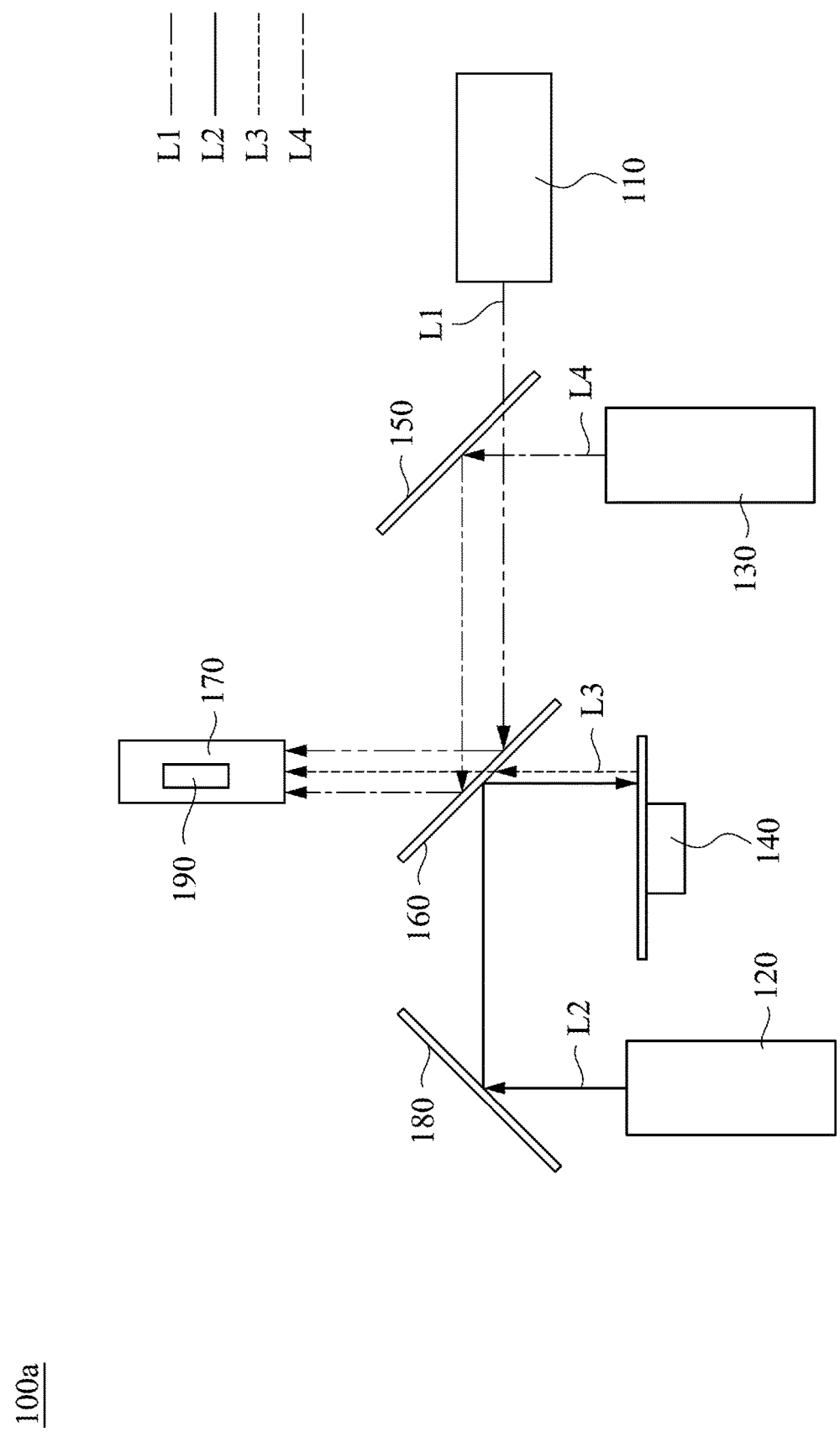
FIG. 5 illustrates a schematic top view of a projection system according to another embodiment of the present disclosure.

Reference is now made to FIG. 5. Compared with the embodiment shown in FIG. 1, the projection system 100a also includes the first light source 110, the second light source 120, the third light source 130, the wavelength converter 140, the first light splitting element 150, the second light splitting element 160, the light integrator 170, and the light path adjusting element 180. Elements and functions that are similar with the aforementioned FIG. 1 embodiments are omitted to reduce repetition. In the present embodiment, the first light splitting element 150 permits the first light L1 to pass through and reflect the fourth light L4. The second light splitting element 160 is designed to reflect most of the light with wavelength longer than its half transmission wavelength, and permits light with wavelength shorter than its half transmission wavelength to pass. A longest wavelength of a full transmission wavelength range of the second light splitting element 160 is called the cut-off wavelength. In the present embodiment, the cut-off wavelength of the second light splitting element 160 is located within the wavelength range of the first light L1. A portion of the first light L1 is removed by transmission, and a portion of the red light L3r of the third light L3 is removed by reflection, and portions of the first light L1 and the third light L3 enters the light integrator 170. As such, the abovementioned effects in the present disclosure may also be achieved.

Figure 6:
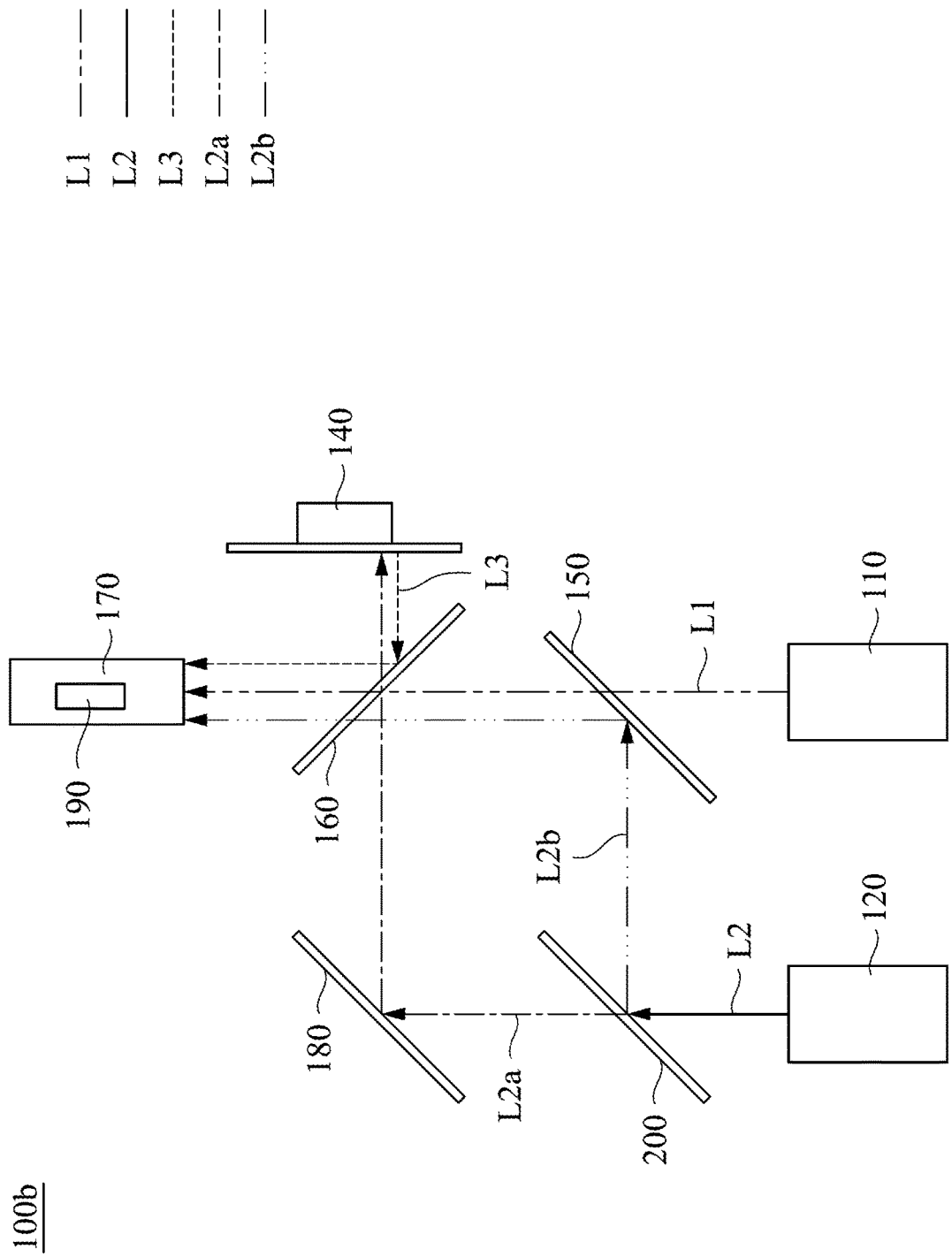
FIG. 6 illustrates a schematic top view of a projection system according to another embodiment of the present disclosure.

Reference is made to FIG. 6. Compared with the embodiment shown in FIG. 1, the projection system 100b also includes the first light source 110, the second light source 120, the wavelength converter 140, the first light splitting element 150, the second light splitting element 160, the light integrator 170, and the light path adjusting element 180. Elements and functions that are similar with the aforementioned FIG. 1 embodiments are omitted to reduce repetition. Compared to FIG. 1, the projection system 100b does not include the third light source 130 (i.e., does not include the fourth light L4), and further includes a light distribution device 200. Furthermore, the first light splitting element 150 permits light band of a certain wavelength range of the first light L1 to pass through, and removes light band of the other wavelength range of the first light L1 by reflection. As shown in FIG. 6, the light distribution device 200 splits the second light L2 emitted by the second light source 120 into the first portion L2a of the second light L2 and the second portion L2b of the second light L2. The first portion L2a of the second light L2 travels in the order of the light path adjusting elements 180, the second light splitting element 160, and the wavelength converter 140. The second portion L2b of the second light L2 travels in the order of the first light splitting element 150 and the second light splitting element 160.

The first light L1 and the second portion L2b of the second light L2 incident upon two opposite surfaces of the first light splitting element 150. The first light splitting element 150 permits the first light L1 to pass through and reflect the second portion L2b of the second light L2, and incorporating the first light L1 and the second portion L2b of the second light L2 into a same beam of light. The combined beam of light (which includes the first light L1 and the second portion L2b of the second light L2) and the first portion L2a of the second light L2 incident upon the same side of the second light splitting element 160. The second light splitting element 160 permits the first light L1, the first portion L2a of the second light L2, and the second portion L2b of the second light L2 to pass through. For the first portion L2a of the second light L2, after passing through the second light splitting element 160, it incidents upon the wavelength converter 140, which then converts the first portion L2a of the second light L2 into a third light L3. The converted third light L3 incidents upon an other side of the second light splitting element 160, and is reflected by the second light splitting element 160, wherein the second light splitting element 160 incorporates the first light L1, the second portion L2b of the second light L2, and the third light L3 into a same beam of light.

In the present embodiment, the wavelength range of the first portion L2a of the second light L2 and the wavelength range of the second portion L2b of the second light L2 are the same as the wavelength range of the second light L2 before passing through the light distributing device 200. In other words, the light distribution device 200 does not affect the wavelength of the second light L2 passing through it. The light distribution device 200 only distributes the energy of the second light L2. In the present embodiment, the light distribution device 200 permits a portion of the energy (e.g., 40% of the energy) of the second light L2 to penetrate and form the first portion L2a of the second light L2. Meanwhile, the light distribution device 200 reflects the remaining portion of the energy (e.g., 60% of the energy) of the second light L2 and form the second portion L2b of the second light L2. In an embodiment, the light distribution device 200 can achieve a light distribution effect by having different transmittances at different angles. In particular, the light distribution device 200 can be a neutral density filter (ND Filter), but the present disclosure is not limited in this regard.

In the present embodiment, the cut-off wavelength of the second light splitting element 160 is also located within the wavelength range of the first light L1. A portion of the red light L3r of the third light L3 is removed by transmission, a portion first light L1 of the is removed by reflection, and portions of the first light L1 and the third light L3 enters the light integrator 170. As such, the abovementioned effects in the present disclosure can also be achieved.

Figure 7:
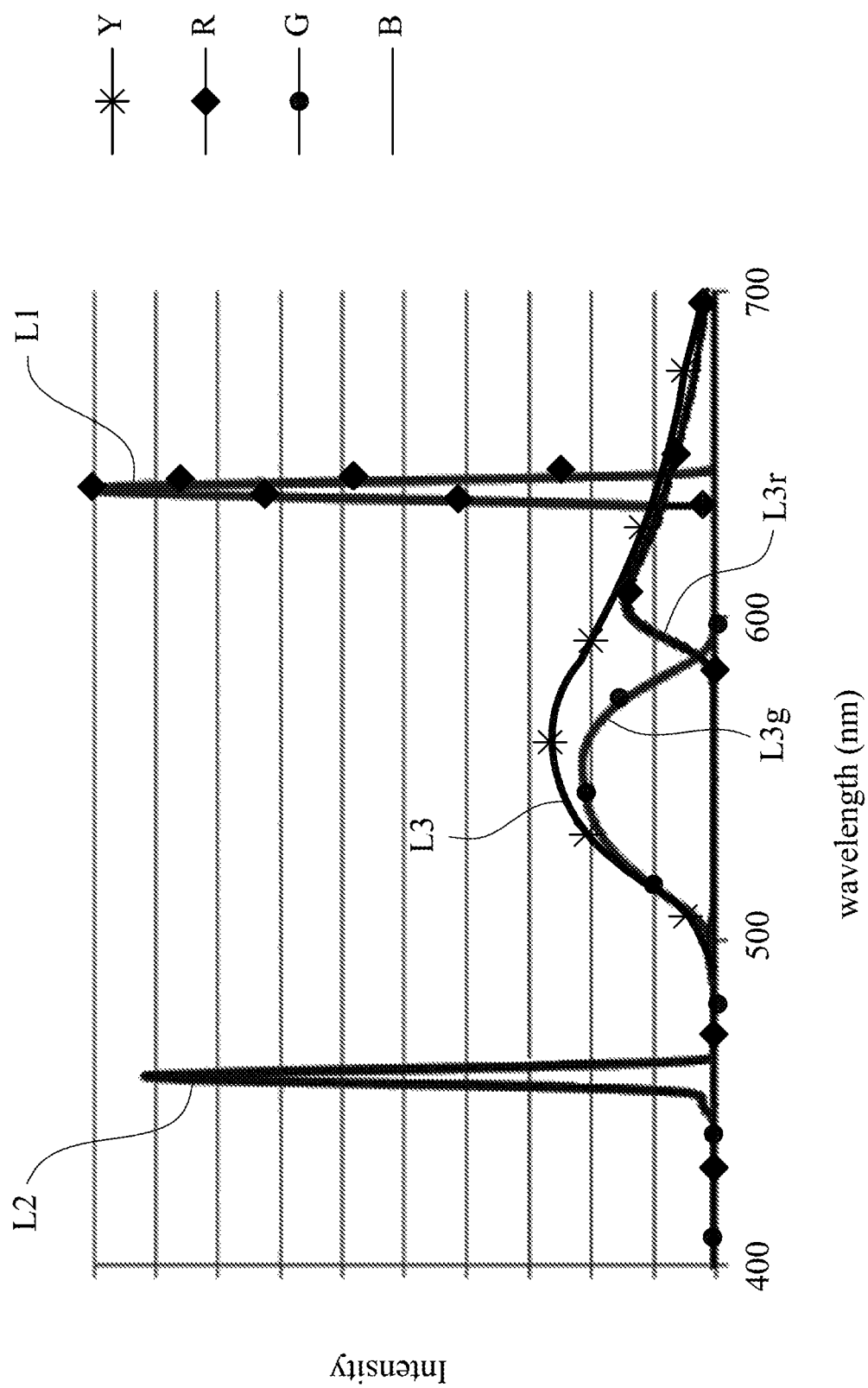
FIG. 7 illustrates an intensity-wavelength diagram of the lights of the projection system shown in FIG. 6.

Reference is made to FIG. 7, which shows that a peak intensity wavelength (the wavelength corresponding to the highest intensity) of the second light L2 is shorter than a peak intensity wavelength of the third light L3, which is shorter than a peak intensity wavelength of the first light L1. In the present embodiment, since there is no third light source 130 emitting the fourth light L4 (previous embodiment shown with a peak wavelength of about 462 nm), the source of the blue light only comes from the second light L2 (which has the peak wavelength is about 455 nm) emitted by the second light source 120. Compared to the projection systems 100 and 100a, the projection system 100b exhibits a hue that is more biased toward a color of blue-violet, which is shorter in wavelength. In addition, since the third light source 130 is not present, the volume of the projection system 100b can be reduced, thereby achieving the purpose of simplifying the system.

Figure 8:
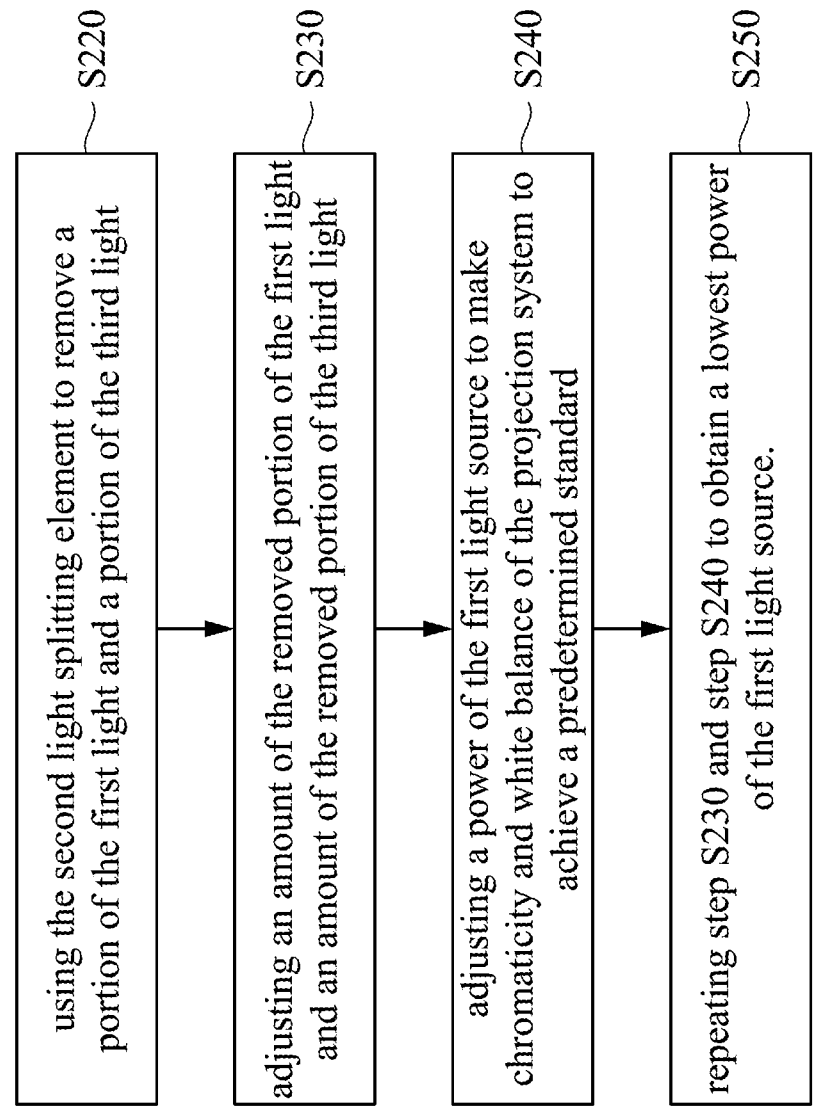
FIG. 8 illustrates an optimization method for the projection system shown in FIG. 1.

Reference is made to FIG. 8, which illustrates an optimization method 210 for the projection system 100 as shown in FIG. 1 and one of the embodiments is chosen for use as an example. The half transmission wavelength of the second light splitting element 160 may be tuned to optimize the projection system 100 shown in FIG. 1, as such making the projection system 100 to achieve the DCI standard with lower power output.

The half transmission wavelength of the second light splitting element 160 may be obtained by method as shown in FIG. 8. Referring to FIG. 1 and FIG. 8, the optimization method 210 starts from step S220: using the second light splitting element 160 to remove a portion of the first light L1 and a portion of the third light L3. In step S220, a boundary wavelength is defined, and a portion of the first light L1 with wavelength shorter than the boundary wavelength is removed, and a portion of the third light L3 with wavelength longer than the boundary wavelength is removed. In particular, please see FIG. 3 which illustrates the embodiment which implements a dichroic as the second light splitting element 160.

Referring to FIG. 3 and FIG. 8, in the step S220, the half transmission wavelength of the second light splitting element 160 is between the peak intensity wavelength of the first light L1 and the peak intensity wavelength of the third light L3. For example, if the peak intensity wavelength of the third light L3 is about 620 nm, and the peak intensity wavelength of the first light L1 is about 635 nm, then the half transmission wavelength of the second light splitting element 160 is in a range of 620 nm to 635 nm. In the present embodiment, the half transmission wavelength of the second light splitting element 160 is designed to be 620 nm.

Next, the optimization method 210 proceeds with step S230: adjusting an amount of the removed portion of the first light L1 and an amount of removed portion of the third light L3. As mentioned above, the changing of the half transmission wavelength of the second light splitting element 160 would correspondingly change the reflectivity of the second light splitting element 160 with respect to the first light L1 and the transitivity of the second light splitting element 160 with respect to the third light L3. In other words, one may adjust the boundary wavelength set in step S220 to adjust the amount of removed portion of the first light L1 and the amount of removed portion of the third light L3.

In the present embodiment, in step S220, the half transmission wavelength of the second light splitting element 160 is set to be a minimum value (620 nm), and the half transmission wavelength of the second light splitting element 160 may be changed by incrementing by 1 nm in step S230. For example, in step S230, the half transmission wavelength of the second light splitting element 160 is changed to be 621 nm.

Next, the optimization method 210 proceeds with step S240: adjusting the power of the first light source 110, to make chromaticity and white balance of the projection system 100 to achieve a predetermined standard. For example, the predetermined standard may be the DCI standard. In step S240, record the lowest necessary power output of the first light source 110 required to achieve the DCI standard.

Next, the optimization method 210 proceeds with step S250: repeat the step S230 and the step S240 to obtain a lowest power of the first light source 110. In other words, as the half transmission wavelength of the second light splitting element 160 is set to be 622 nm, 623 nm . . . 635 nm, the necessary power output of the first light source 110 required to achieve the DCI standard are respectively recorded.

After the step S220 to step S250, the half transmission wavelength of the second light splitting element 160 corresponds to the lowest power output of the first light source 110 may be implemented, as such making the projection system 100 to operate with low power output. However, the exact value of the half transmission wavelength of the second light splitting element 160 should be selected according to practical needs, and the aforementioned content is not intended to limit the present disclosure.

In some embodiments, tristimulus values may be introduced to weighting the intensity of the first light L1 and the third light L3 seen by human eyes, and directly obtain a theoretically optimal half transmission wavelength of the second light splitting element 160. Afterwards, tuning the half transmission wavelength accordingly to find the optimal half transmission wavelength of the second light splitting element 160.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A projection system, comprising:
   a first light source configured to emit a first light;
   a second light source configured to emit a second light;
   a wavelength converter configured to convert a portion or all of the second light into a third light, wherein the third light includes a green light and a red light, and a wavelength range of the first light is within a wavelength range of the red light, and the wavelength range of the first light is greater than a peak intensity wavelength of the red light;
   a first light splitting element configured to permit the first light to pass through or to be reflected; and
   a second light splitting element configured to remove a portion of the first light, and having a cut-off wavelength, wherein the cut-off wavelength is within the wavelength range of the first light configured for removing a portion of the first light or outside the wavelength range of the first light configured for not removing the first light.

2. The projection system of claim 1, wherein a peak intensity wavelength of the second light is shorter than a peak intensity wavelength of the third light, and wherein the peak intensity wavelength of the third light is shorter than a peak intensity wavelength of the first light.

3. The projection system of claim 1, further comprising:
   a light distribution device configured to split the second light into a first portion and a second portion, wherein the wavelength converter is configured to convert the first portion of the second light into the third light.

4. The projection system of claim 3, configured to provide a plurality of light paths including:
   the first light traveling by, in the order of, the first light splitting element, and then the second light splitting element;
   the first portion of the second light traveling by, in the order of, the second light splitting element, the wavelength converter, and then the second light splitting element; and
   the second portion of the second light traveling by, in the order of, the first light splitting element, and then the second light splitting element.

5. The projection system of claim 3, wherein the first light splitting element is configured to incorporate the first light and the second portion of the second light, and wherein the second light splitting element is configured to incorporate an unremoved portion of the first light, the second portion of the second light, and an unremoved portion of the third light into a white light.

6. The projection system of claim 5, further comprising an integrator, wherein the white light incidents into the integrator.

7. The projection system of claim 1, further comprising a third light source configured to emit a fourth light.

8. The projection system of claim 7, configured to provide a plurality of light paths including:
   the first light traveling by, in the order of, the first light splitting element, and then the second light splitting element;
   the second light traveling by, in the order of, the second light splitting element, the wavelength converter, and then the second light splitting element; and
   the fourth light traveling by, in the order of, the first light splitting element, and then the second light splitting element.

9. The projection system of claim 7, wherein a peak intensity wavelength of the second light is shorter than a peak intensity wavelength of the fourth light, wherein the peak intensity wavelength of the fourth light is shorter than a peak intensity wavelength of the third light, and wherein the peak intensity wavelength of the third light is shorter than a peak intensity wavelength of the first light.

10. The projection system of claim 7, wherein the first light splitting element is configured to incorporate the first light and the fourth light, and wherein the second light splitting element is configured to incorporate an unremoved portion of the first light, an unremoved portion of the third light, and the fourth light into a white light.

11. The projection system of claim 10, further comprising an integrator, wherein the white light incidents into the integrator.

12. The projection system of claim 1, wherein the second light splitting element is a dichroic comprising a half transmission wavelength (T50%) between the peak intensity wavelength of the first light and the peak intensity wavelength of the third light.

13. The projection system of claim 12, wherein the wavelength range of the first light is 637 nm to 642 nm, and the half transmission wavelength of the second light splitting element is 629 nm.

14. The projection system of claim 12, wherein the wavelength range of the first light is 642 nm to 646 nm, and the half transmission wavelength of the second light splitting element is 631 nm.

15. The projection system of claim 1, further comprising:
a notch filter configured with two half transmission wavelengths of 565 nm and 586 nm, and a lowest transitivity of less than 40%.

16. An optimization method for the projection system according to claim 1, wherein the optimization method comprises the steps of:
(a) using the second light splitting element to remove a portion of the first light and/or the third light;
(b) adjusting an amount of the removed portion of the first light and an amount of the removed portion of the third light;
(c) adjusting a power of the first light source to make chromaticity and white balance of the projection system to achieve a predetermined standard; and
(d) repeating step (b) and step (c) to obtain a lowest power of the first light source.

17. The optimization method of claim 16, wherein step (a) further comprises:
(i) defining a boundary wavelength;
(ii) removing a portion of the first light that has a wavelength shorter than the boundary wavelength; and
(iii) removing a portion of the third light that has a wavelength longer than the boundary wavelength.

18. The optimization method of claim 17, wherein the boundary wavelength in step (a) is defined between a peak intensity wavelength of the first light and a peak intensity wavelength of the third light.

19. The optimization method of claim 18, wherein the step (b) adjusting the amount of the removed portion of the first light and the amount of the removed portion of the third light is performed by adjusting the boundary wavelength.

20. The optimization method of claim 19, wherein step (b) further comprises:
using tristimulus values to provide weighting for the amount of the removed portion of the first light and the amount of the removed portion of the third light and calculating an optimized value of the boundary wavelength.

* * * * *